US011210234B2

(12) United States Patent
Moyer et al.

(10) Patent No.: US 11,210,234 B2
(45) Date of Patent: Dec. 28, 2021

(54) CACHE ACCESS MEASUREMENT DESKEW

(71) Applicant: ADVANCED MICRO DEVICES, INC., Santa Clara, CA (US)

(72) Inventors: Paul Moyer, Fort Collins, CO (US); John Kelley, Fort Collins, CO (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 100 days.

(21) Appl. No.: 16/669,973

(22) Filed: Oct. 31, 2019

(65) Prior Publication Data
US 2021/0133114 A1 May 6, 2021

(51) Int. Cl.
*G06F 12/12* (2016.01)
(52) U.S. Cl.
CPC ........ *G06F 12/12* (2013.01); *G06F 2212/601* (2013.01)
(58) Field of Classification Search
CPC ..................................................... G06F 12/12
USPC ......................................................... 711/133
See application file for complete search history.

(56) References Cited

U.S. PATENT DOCUMENTS 9,047,225 B1 * 6/2015 Evans ................... G06F 12/127
2008/0086600 A1 4/2008 Qiao 2016/0239432 A1 8/2016 Zhuang et al.
2017/0075808 A1 3/2017 Noguchi et al.
2019/0004970 A1 1/2019 Pham et al.

FOREIGN PATENT DOCUMENTS

WO 2018098225 A2 5/2018

OTHER PUBLICATIONS

Ros, Alberto, et al., "ASCIB: Adaptive Selection of Cache Indexing Bits for Removing Conflict Misses" Proceedings of the International Symposium on Low Power Electronics and Design, Jul. 30-Aug. 1, 2012, 6 pages.
International Search Report and Written Opinion dated Feb. 16, 2021 in Application No. PCT/US2020/057966, 9 pages.

* cited by examiner

*Primary Examiner* — Jae U Yu

(57) ABSTRACT

A processor includes a cache having two or more test regions and a larger non-test region. The processor further includes a cache controller that applies different cache replacement policies to the different test regions of the cache, and a performance monitor that measures performance metrics for the different test regions, such as a cache hit rate at each test region. Based on the performance metrics, the cache controller selects a cache replacement policy for the non-test region, such as selecting the replacement policy associated with the test region having the better performance metrics among the different test regions. The processor deskews the memory access measurements in response to a difference in the amount of accesses to the different test regions exceeding a threshold.

20 Claims, 4 Drawing Sheets

CACHE ACCESS MEASUREMENT DESKEW

BACKGROUND

To improve memory access efficiency, many processors employ a memory hierarchy including one or more caches to store a subset of data stored in main memory. The processor moves data between the caches and main memory, and between the individual caches, based on a memory management scheme that depends on the processor design, but typically prioritizes the caching of data that has recently been accessed. For example, some processors employ one or more prefetchers that predict data that is likely to be accessed by the processor core in the near future and copies that data from main memory to the one or more caches. In order to move new data into the one or more caches, the processor typically selects previously stored data for eviction based on a specified replacement scheme such as a least-recently-used (LRU) replacement scheme, whereby the processor evicts the cache entry that stores data that has not been accessed by the processor core for the greatest amount of time. However, in many scenarios the LRU replacement scheme does not correspond with the memory access patterns of instructions executing at the processor core, resulting in undesirably low memory access efficiency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
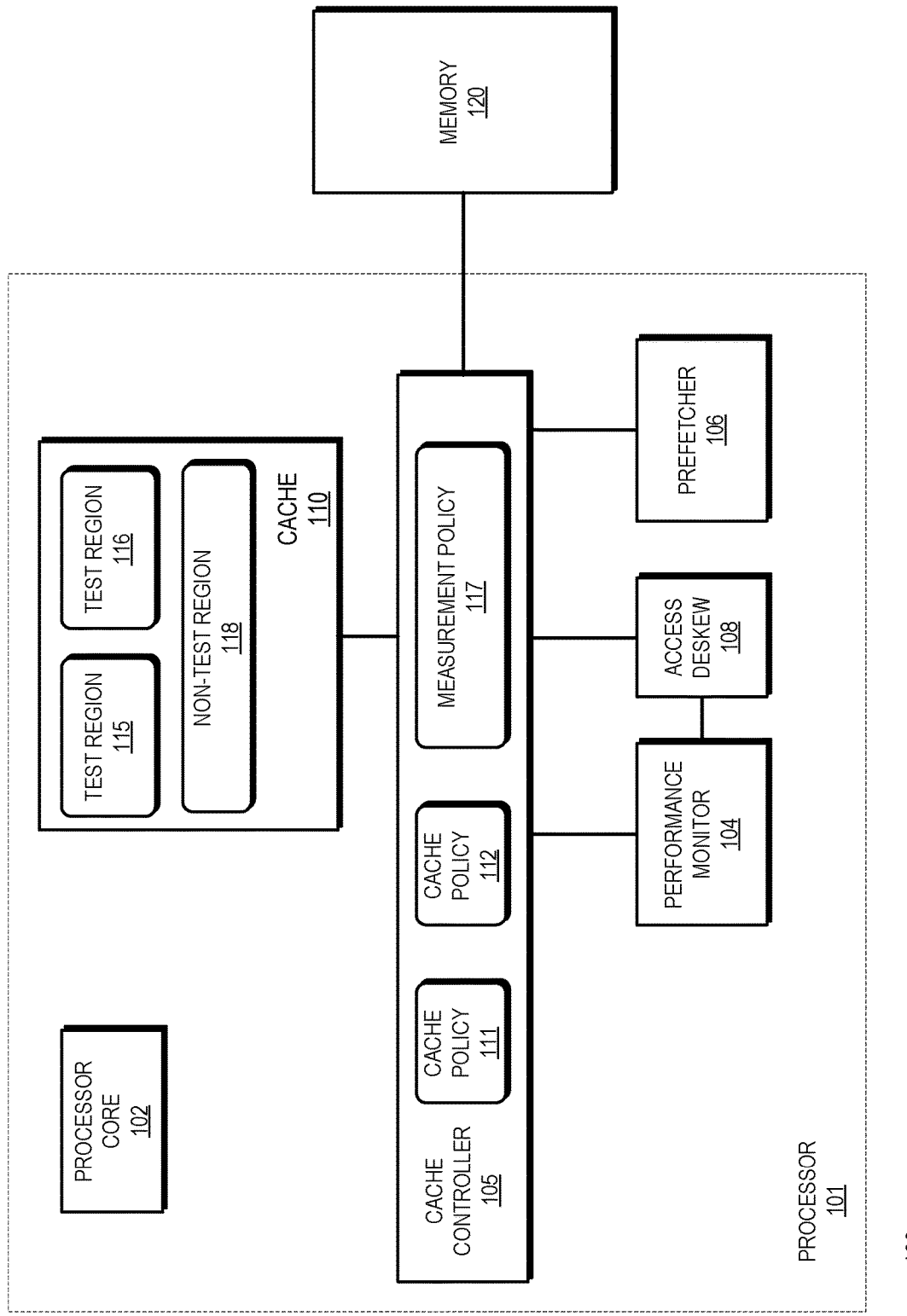
FIG. 1 is a block diagram of a processing system that deskews access measurements for different test regions of a cache to allow access metrics to establish a cache replacement policy for a non-test region of the cache in accordance with some embodiments.

FIGS. 1-6 illustrate techniques for deskewing access measurements to different test regions of a cache, thereby supporting accurate measurement of performance metrics for each test region, wherein the performance metrics in turn support application of a cache replacement policy at a non-test region of the cache. To illustrate, in some embodiments a processor includes a cache having two or more test regions and a larger non-test region. The processor further includes a cache controller that applies different cache replacement policies to the different test regions of the cache, and a performance monitor that measures performance metrics for the different test regions, such as a cache hit rate at each test region. Based on the performance metrics, the cache controller selects a cache replacement policy for the non-test region, such as selecting the replacement policy associated with the test region having the better performance metrics among the different test regions. However, in some cases, memory access patterns cause skewed memory accesses between the different test regions, and these skewed accesses in turn skew the performance metrics, potentially resulting in a less efficient cache replacement policy for the non-test region. By deskewing the memory access measurements as described further herein, the processor provides for selecting the more efficient cache replacement policy in more cases, thereby improving overall cache efficiency.

To further illustrate via an example, in some embodiments the processor measures the cache hit rate for each of two test regions and selects the cache replacement policy associated with the test region having the higher cache hit rate. However, if a given one of the test regions receives substantially more memory accesses than the other test region, the cache hit rates for the different test regions are skewed—that is, are higher or lower than they would be under most memory access patterns. In particular, in some cases the processor executes a subset of a set of instructions, such that executing the subset results in a pattern of accesses to the cache that are not representative of the memory access pattern associated with the full set of instructions. Such a pattern of accesses to the cache is referred to herein as a non-representative memory access pattern. In some cases, a non-representative memory access pattern results in the cache test region associated with a less efficient cache replacement policy, on average, to temporarily have a higher cache hit rate than the cache test region associated with a more efficient cache replacement policy. By deskewing the access measurements to the different cache regions, as described further herein, a processor prevents the less efficient cache replacement policy from being selected due to the occurrence of a non-representative memory access pattern.

In some embodiments, to deskew the access measurements, the cache controller compares the number of accesses to each of two test regions over a sliding time window. In response to the difference in the number of accesses exceeding a threshold, the processor changes an access measurement policy that governs how accesses to each test region are measured for purposes of selecting a cache replacement policy. For example, in some embodiments the access measurement policy is changed so that accesses to one of the test regions are omitted from the replacement policy selection process for a specified amount of time, thereby deskewing the access measurements. In other embodiments, selection of the cache replacement policy is based on a weighted comparison of different performance criteria, with the weight for each test region indicated by the access measurement policy. To deskew the access measurements, the cache controller changes one or more of the indicated weights.

In some embodiments, the processor employs the comparison of the number of accesses for the test regions to balance accesses to different regions of the cache. To illustrate, in some embodiments the cache controller uses a specified hash when accessing (reading from or writing to) the cache, wherein the hash is expected to spread out the accesses, thereby improving overall cache utilization. However, a relatively large number of accesses to a test region indicates that the hash value is insufficiently spreading the accesses. Accordingly, in response to the difference in the number of accesses to the test regions of the cache exceeding a threshold, the cache controller changes the hash value to a different specified value, thereby improving cache utilization and memory access efficiency.

FIG. 1 illustrates a processing system 100 that applies a cache aging policy to a portion of a cache based on access metrics for different test regions of the cache in accordance with some embodiments. The processing system 100 generally executes sets of instructions organized in the form of computer programs in order to carry out tasks on behalf of an electronic device. Accordingly, in different embodiments the processing system 100 is used in any of a variety of electronic devices, such as a desktop or laptop computer, server, smartphone, tablet, game console, and the like.

To facilitate execution of instructions, the processing system 100 includes a processor 101 having a processor core 102, a cache controller 105, an access deskew module 108, a cache 110, and further includes a memory 120. In some embodiments, the processor core 102, cache controller 105, and cache 110 are formed on the same semiconductor die to form at least a portion of the processor 101, and the memory 120 is formed on a different semiconductor die and connected to the processor 101 via one or more buses or signal lines. In some embodiments, at least a portion of the memory 120 is formed on the same semiconductor die as modules of the processor 101.

The cache 110 and the memory 120 are each memory devices that store data and in different embodiments is one or more of random access memory (RAM) memory modules, non-volatile memory devices (e.g., flash memory), and the like. As described further herein, the cache 110 and the memory 120 form a memory hierarchy for the processing system 100. In addition, in some embodiments the memory hierarchy of the processing system 100 includes other memory modules, such as additional caches not illustrated at FIG. 1.

The processor core 102 includes an instruction pipeline having, for example, a fetch stage to fetch instructions, a decode stage to decode each fetched instruction into one or more operations, execution stages to execute the operations, and a retire stage to retire instructions whose operations have completed execution. One set of operations generated based on the instruction are referred to herein as memory access instructions and are requests to load data (load operations) from the memory hierarchy of the processing system 100, and requests to store data at the memory hierarchy of the processing system 100. Memory access requests generated by the processor core 102 represent requests to load or store data that are being used or are known to be needed by an executing program and are referred to herein as demand requests.

The cache controller 105 is a module that manages the memory hierarchy of the processing system 100 by moving data between the cache 110 and the memory 120. In particular, the cache 110 is a memory device including a plurality of entries, whereby each entry is associated with one or more addresses of the memory 120. In response to a memory access request, the cache controller 105 reviews the data stored at one or more entries of the cache 110 to determine if any of the entries stores data associated with the memory address targeted by the memory access request. If so, the cache controller 105 indicates a cache hit and satisfies the memory access request at the identified entry, either by storing data at the entry (in the case of a store operation) or by providing the data at the identified entry to the processor core 102 (in the case of a load operation). If data associated with the memory address is not stored at an entry of the cache 110, the cache controller 105 indicates a cache miss and issues a request to the memory 120 for the data at the memory address. The cache controller 105 then stores the data at an entry of the cache 110 and satisfies the memory access request at the entry.

To support improved memory access efficiency, the processor 101 includes a prefetcher 106 that monitors demand requests issued to the cache controller 105 to identify patterns and predict, based on the identified patterns, memory addresses that will be the target of demand requests by the processor core 102 in the near future. The prefetcher 106 issues to the cache controller memory access requests, referred to herein as prefetch requests, targeting the identified memory addresses. The cache controller 105 treats a prefetch request similar to a demand request by first identifying if data associated with the memory address targeted by the prefetch request is already stored at an entry of the cache 110 and, if not already stored, requesting the data from the memory 120 and storing the data at an entry of the cache 110.

In some embodiments, each entry of the cache 110 is associated with a subset of memory addresses and only data associated with that subset is permitted to be stored at the entry. For example, in some embodiments the cache is an N-way set associative cache having M sets and each of the M sets including N entries. Each of the M sets is assigned a different subset of memory addresses, such that the cache controller 105 only stores data at an entry if the data is associated with a memory address in the entry's assigned subset. When all entries of a set store data (referred to herein as "valid data") that may be the target of a memory access, the set is referred to herein as full. Further, when the cache controller 105 receives data that is to be stored at a full set, it selects one of the entries of the set to evict (that is, to remove from the set) and replace with the received data. The scheme that the cache controller 105 uses to select the entry for eviction is referred to as replacement policy for the cache 110. In different embodiments, the replacement policy incorporates any of a number of criteria, such as initial age values assigned to entries as they are stored, changes in age values, whether data at an entry was fetched in response to a demand request or a prefetch request, and the like.

In some embodiments, the cache controller 105 applies different replacement policies to different regions of the cache 110, wherein each region includes a plurality of entries. In at least one embodiment, each region only varies as to its replacement policy. Thus, the entries of a region are able to be used for any set, and different regions are able to include different entries of the same set. In the depicted example of FIG. 1, the cache 110 includes three regions: test regions 115 and 116 and non-test region 118. In addition, the cache controller 105 stores replacement policies 111 and 112 that differ in at least one aspect, such as the initial age value assigned to an entry, the amount by which an age value is adjusted in response to a specified criterion, and the like. In some embodiments, the replacement policy 111 mandates a specified initial age for entries that store data responsive to a prefetch request and a different specified initial age for entries that store data responsive to non-prefetch requests. As used herein, a non-prefetch request refers to a memory access that is not a prefetch request targeted to the cache level to which the aging policy is applied. Examples of non-prefetch requests include demand requests, memory access requests generated in response to instruction cache misses, hardware page table walk requests, speculative memory access requests generated by the processor core 102 (e.g., memory access requests generated during speculative execution of instructions after a branch instruction), and prefetch requests generated at other cache levels. In contrast, the replacement policy 112 mandates the same initial age for entries that store data responsive to a prefetch request and entries that store data responsive to a non-prefetch request. In some embodiments, the replacement policy 111 is therefore more efficient for memory access patterns that more frequently access prefetched data, and the replacement policy 112 more efficient for memory access patterns that access prefetched data and non-prefetched data at about the same frequency. However, the memory access pattern for the processor core 102 varies over time, such that the cache 110 operates more efficiently under different aging policies at different times. Accordingly, for the non-test region 118, the cache controller 105 selects between the aging policies 111 and 112 depending on performance characteristics of the test regions 115 and 116.

To illustrate, the processor 101 includes a performance monitor 104 that monitors and records performance characteristics, such as cache hit rate, cache miss rate, and the like, for each of the test regions 115 and 116. Based on one or more of the performance characteristics, or a combination thereof, of the test regions 115 and 116, the cache controller selects one of the replacement policies 111 and 112 and applies it to the non-test region 118. For example, if the cache hit rate for the test region 115 is higher than the cache hit rate for the test region 116, the cache controller 105 selects the replacement policy for the test region 115 (e.g., replacement policy 111) and applies it to the non-test region 118. In some embodiments, the non-test region 118 includes the majority of the entries of the cache 110. Thus, by selecting the aging policy for the non-test region 118 as the more efficient aging policy, as indicated by the performance of the test regions 115 and 116, the cache controller 105 enhances the overall efficiency of the cache 110. Further, as the performance characteristics of the test regions 115 and 116 change over time, the cache controller 105 changes the replacement policy to the policy that is more efficient for a given set of performance characteristics.

The performance monitor 104 measures performance characteristics for the test regions 115 and 116 based on a measurement policy 117. In some embodiments, the measurement policy 117 governs how measurement of accesses to the test regions 115 and 116 affect the selection of the replacement policy for the non-test region 118. For example, in some embodiments, the measurement policy 117 is set by the cache controller to any one of a plurality of states, wherein the different states are categorized as an unskewed state and one or more deskew states. When the measurement policy 117 is in the unskewed state, the cache controller 105 selects the cache policy for the non-test region based on the nominal, unmodified performance characteristics for the test regions 115 and 116. When the measurement policy 117 is in one of the deskew states, one or more of the policy selection process, or the values of the performance characteristics themselves, are modified for purposes of selecting the replacement policy for the non-test region 118. In particular, the policy selection process or the performance characteristic values are modified to deskew relatively large differences in the number of accesses to the different test regions 115 and 116.

For example, in some embodiments, for each test region the performance monitor 104 records a weighted representation of the cache hit rate, designated WCHR, where WCHR is calculated by the following formula:

$$WCHR = W_{TR} * CHR$$

where $W_{TR}$ is the weight associated with a test region, and CHR is the nominal (unweighted) cache hit rate for the test region. When the measurement policy 117 is in the unskewed state, the performance monitor 104 sets the weights for the performance characteristics for each of the test regions 115 and 116 to a first specified value (e.g., a value of one for each weight). When the measurement policy 117 is in one of the deskew states, the performance monitor 104 sets the weights associated with at least one of the test regions 115 and 116 to a second specified value, thereby deskewing access measurements associated with one of the test regions, as described further herein. For example, in some embodiments when the measurement policy 117 is in the unskewed state, the weights associated with each of the test regions 115 and 116 are equal, and when the measurement policy 117 is in one of the deskew states, the weights associated with the test region 115 is different than the weight associated with the test region 116.

In some embodiments, the state of the measurement policy 117 does not govern measurement of the performance characteristics directly, but instead governs whether the cache controller 105 is permitted to change the replacement policy for the non-test region 118. Thus, when the measurement policy 117 is in the unskewed state, the cache controller 105 permits changes to the replacement policy for the non-test region 118 based on the performance characteristics for the test regions 115 and 116. When the measurement policy 117 is in a deskew state, the cache controller 105 suspends changes to the replacement policy for the non-test region 118 until the measurement policy 117 is returned to the unskewed state.

As noted above, some memory access patterns experienced by the cache are non-representative patterns that are not representative of the memory access pattern associated with a given application or other set of instructions being executed by the processor 101. In some cases, such non-representative memory access patterns would cause anomalies in the performance characteristics recorded by the performance monitor 104, and these anomalies would in turn cause the cache controller to select the less efficient one of the cache replacement polices 111 and 112 for the non-test region 118. To ameliorate the impact of these non-representative memory access patterns, the access deskew module 108 monitors, over a sliding time window, the difference between the number of memory accesses to the test region 115 and the number of memory accesses to the test region 116. In response to the difference exceeding a specified threshold, the access deskew module 108 changes the measurement policy 117 from the unskewed state to the deskew state to deskew the effect of the access measurements for each test region. For example, in some embodiments, in response to the difference in the number of memory accesses exceeding the threshold, the access deskew module 108 changes the measurement policy 117 to the deskew state, thereby suspending changes in the replacement policy for the non-test region 118. In response to the difference in access measurements for the test regions 115 and 116 over the sliding time window falling below the threshold, the access deskew module 108 returns the measurement policy 117 to the unskewed state, thereby resuming changes in the replacement policy for the non-test region 118 (when such changes are indicated by the relative performance characteristics as discussed above).

In other embodiments, in response to the difference in the number of memory accesses exceeding the threshold, the access deskew module 108 changes the measurement policy 117 to a deskew state, thereby changing the weight (the $W_{TR}$) values for the test regions 115 and 116 to reduce the relative weight for the test region having the higher number of accesses. For example, in some embodiments, in response to the test region 115 having a number of accesses, over the sliding time window, that exceeds the number of accesses to the test region 116 by more than the threshold, the access deskew module 108 changes the measurement policy 117 to a state that reduces the weight associated with the test region 115 (or increases the weight associated with the test region 116, or a combination thereof), thereby reducing the likelihood that the non-representative memory access pattern will result in a change to the replacement policy for the non-test region 118. In response to the difference in access measurements for the test regions 115 and 116 over the sliding time window falling below the threshold, the access deskew module 108 sets the measurement policy 117 to its unskewed state, thereby returning the weights for the test regions to their nominal values.

In some embodiments, the weight selected for the test region to be deskewed is based upon the magnitude of the difference between accesses to the different test regions 115 and 116. Thus, for example, in some embodiments the magnitude of the difference in accesses between the test regions 115 and 116 is given by the following formula:

$$Access_{Diff} = |Accesses_{115} - Accesses_{116}|$$

where $Accesses_{115}$ is the number of accesses to the test region 115 over the sliding time window and $Accesses_{116}$ is the number of accesses to the test region 116 over the sliding time window. In some embodiments, the weight applied to the performance characteristics for each test region is based upon the value of $Access_{Diff}$.

Figure 2:
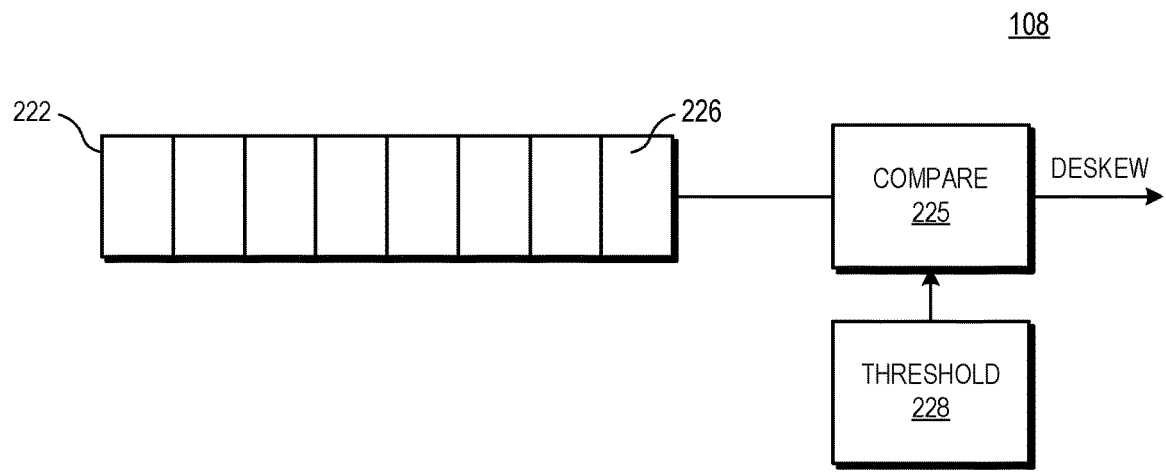
FIG. 2 is a block diagram of an access deskew module of the processing system of FIG. 1 that deskews access measurements for the different test regions of the cache in accordance with some embodiments.

FIG. 2 illustrates a block diagram of the deskew module 108 in accordance with some embodiments. The deskew module 108 includes a shift register 222 and a compare module 225. The shift register 222 includes a plurality of fields (e.g., field 226). For each access to a test region, the shift register 222 1) shifts the value of each field one position to the left, with the leftmost field prior to shifting being discarded; and 2) stores a value of 1 at the rightmost bit position in response to a memory access to the test region 115, and a value of 0 at the rightmost bit position in response a memory access to the test region 116. The numbers of ones and zeroes stored at the shift register 222 therefore represent the number of memory accesses at the test regions 115 and 116 respectively over a sliding time window.

The compare module 225 determines the difference between the numbers of ones and zeroes stored at the shift register 222 and determines if the magnitude of the difference exceeds a threshold value 228. In some embodiments, the threshold value 228 is set during a characterization or testing process of the processor 101 or of the processing system 100. In other embodiments, the threshold value 228 is set based on a value indicated by an executing program, or by a compiler that compiled a program. The threshold value 228 is thereby set according to the particular set of instructions being executed at the processor 101.

The compare module 225 sets the state of an output signal, designated DESKEW, based on the comparison of the magnitude of the difference to the threshold 228. Thus, for example, in response to the magnitude of the difference being equal to or below the threshold 228, the compare module 225 sets the DESKEW signal to a first state corresponding to unskewed access measurements, and in response to the magnitude being above the threshold 228, the compare module 225 sets the DESKEW signal to a second state corresponding to skewed access measurements. Based on the state of the DESKEW signal, the cache controller 105 sets the measurement policy 117. Thus, for example, in response to the DESKEW signal indicating unskewed access measurements, the cache controller 105 sets the measurement policy 117 to its unskewed state. In response to the DESKEW signal indicating unskewed access measurements, the cache controller 105 sets the measurement policy 117 to a deskew state in order to deskew the measurement of performance characteristics as described above, such as by suspending changes in the cache replacement policy or by changing the performance characteristic weights associated with each of the test regions 115 and 116.

Figure 3:
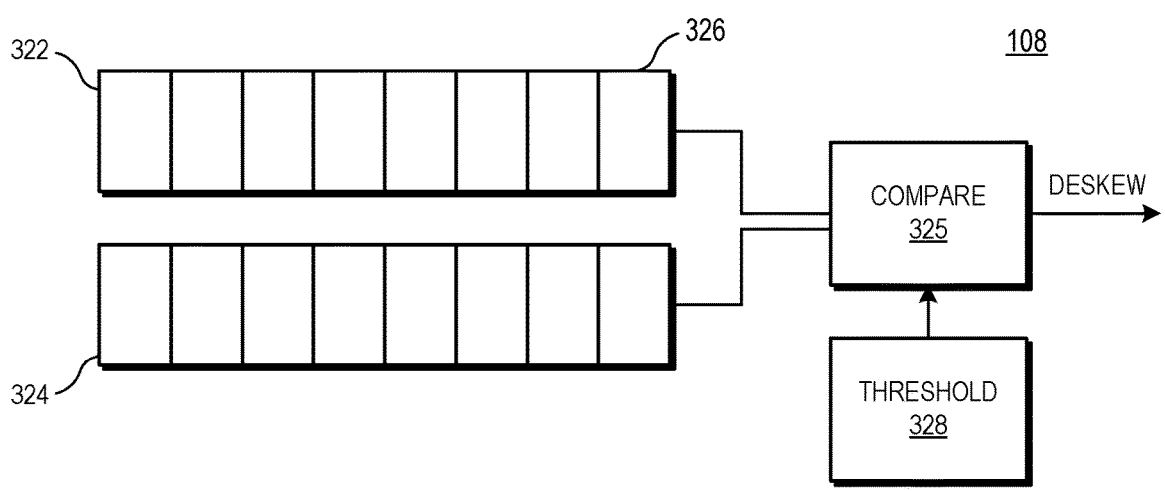
FIG. 3 is a block diagram of another example of the access deskew module of the processing system of FIG. 1 that deskews access measurements for the different test regions of the cache in accordance with some embodiments.

In some embodiments, the deskew module 108 monitors accesses of different types, and indicates a change in the measurement policy 117 in response to the difference in the number of accesses of a given type to the test regions 115 and 116 exceeding a corresponding threshold. An example is illustrated at FIG. 3 in accordance with some embodiments. In particular, in the example of FIG. 3 the deskew module 108 includes two shift registers 322 and 324 and a compare module 325. Each of the shift registers 322 and 324 keeps track of memory accesses of a different type at the test regions 115 and 116.

To illustrate, in some embodiments the shift register 322 tracks demand accesses to the test regions 115 and 116. For each demand access to a test region, the shift register 322 1) shifts the value of each field one position to the left, with the leftmost field prior to shifting being discarded; and 2) stores a value of 1 at the rightmost bit position in response to a demand access to the test region 115, and a value of 0 at the rightmost bit position (field 326) in response a memory access to the test region 116. The numbers of ones and zeroes stored at the shift register 322 therefore represent the number of demand accesses at the test regions 115 and 116 respectively over a sliding time window. The shift register 324 tracks prefetch accesses to the test regions 115 and 116 in a similar manner.

The compare module 325 sets the state of the DESKEW signal, based on the comparison of each of the magnitudes of the difference in the two types of memory accesses to a threshold 328. Thus, for example, in response to the magnitude of the difference in demand accesses to the test regions 115 and 116 being equal to or below the threshold 328, the compare module 325 sets the DESKEW signal to the first state corresponding to unskewed access measurements, and in response to the magnitude being above the threshold 328, the compare module 325 sets the DESKEW signal to the second state corresponding to skewed access measurements. Similarly, in response to the magnitude of the difference in prefetch accesses to the test regions 115 and 116 being equal to or below the threshold 328, the compare module 325 sets the DESKEW signal to the first state corresponding to unskewed access measurements, and in response to the magnitude being above the threshold 328, the compare module 325 sets the DESKEW signal to the second state corresponding to skewed access measurements.

It will be appreciated that in some embodiments, the deskew module 108 stores different thresholds, having different values, for the demand accesses and the prefetch accesses. Further, in some embodiments in addition to or instead of the shift registers 322 and 324, the deskew module 108 includes shift registers to track memory accesses of other types, such as memory accesses to different cache levels. Moreover, in some embodiments the cache controller 105 changes the measurement policy 117 to different states depending on which types of memory accesses resulted in assertion of the DESKEW signal.

Figure 4:
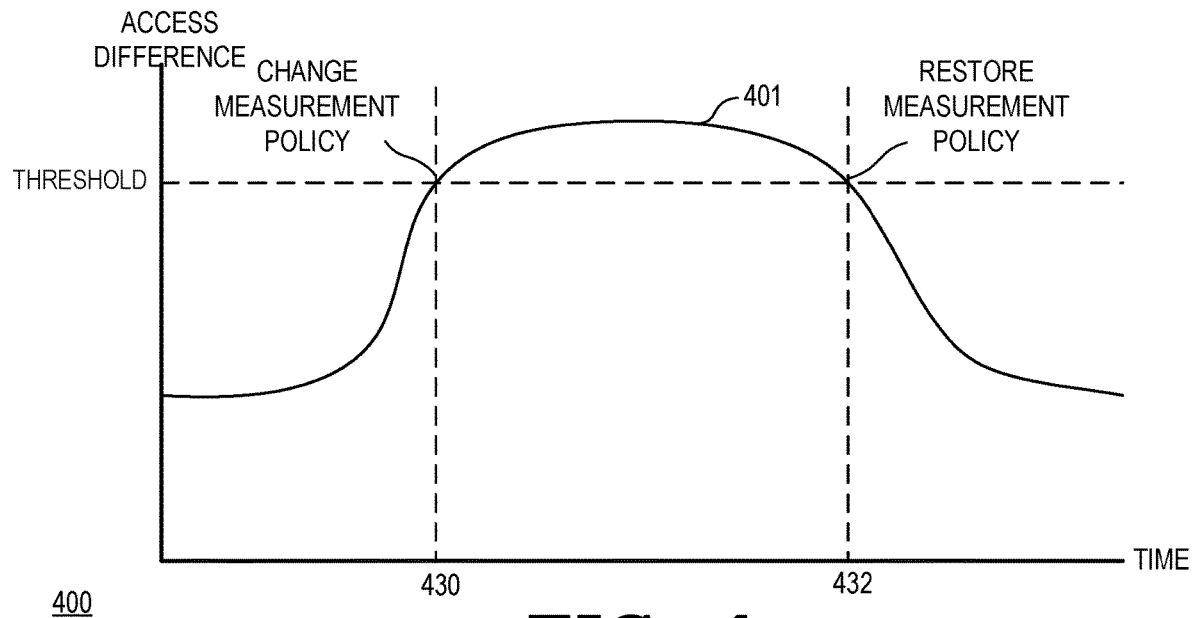
FIG. 4 is a diagram illustrating an example of the processing system of FIG. 1 deskewing access measurements for test regions of the cache in accordance with some embodiments.

FIG. 4 illustrates a diagram 400 depicting an example of changing the measurement policy 117 of the processor 101 in accordance with some embodiments. The diagram 400 includes an x-axis representing time and a y-axis representing the magnitude of the difference in the number of memory accesses for each of the test regions 115 and 116. The plot 401 illustrated at diagram 400 therefore represents the magnitude of the difference in the number of memory accesses for each of the test regions 115 and 116 over time.

In the depicted example, prior to a time 430, the magnitude of the difference in the number of memory accesses is below the threshold 228. Accordingly, prior to time 430, the cache controller 105 maintains the measurement policy 117 in the deskewed state, wherein the performance characteristics associated with the test regions 115 and 116 are not deskewed. At time 430, the magnitude of the difference in the number of memory accesses reaches, and subsequently exceeds, the threshold 228. In response, the cache controller 105 changes the measurement policy 117 to a deskew state to deskew the performance characteristics, such as by changing one or more weights applied to the performance characteristics, by suspending changes to the cache replacement policy for the non-test region 118 of the cache 110, and the like. At time 432 (after time 430), the magnitude of the difference in the number of memory accesses falls below the threshold 228. In response the cache controller 105 returns the measurement policy 117 to the nominal state.

Figure 5:
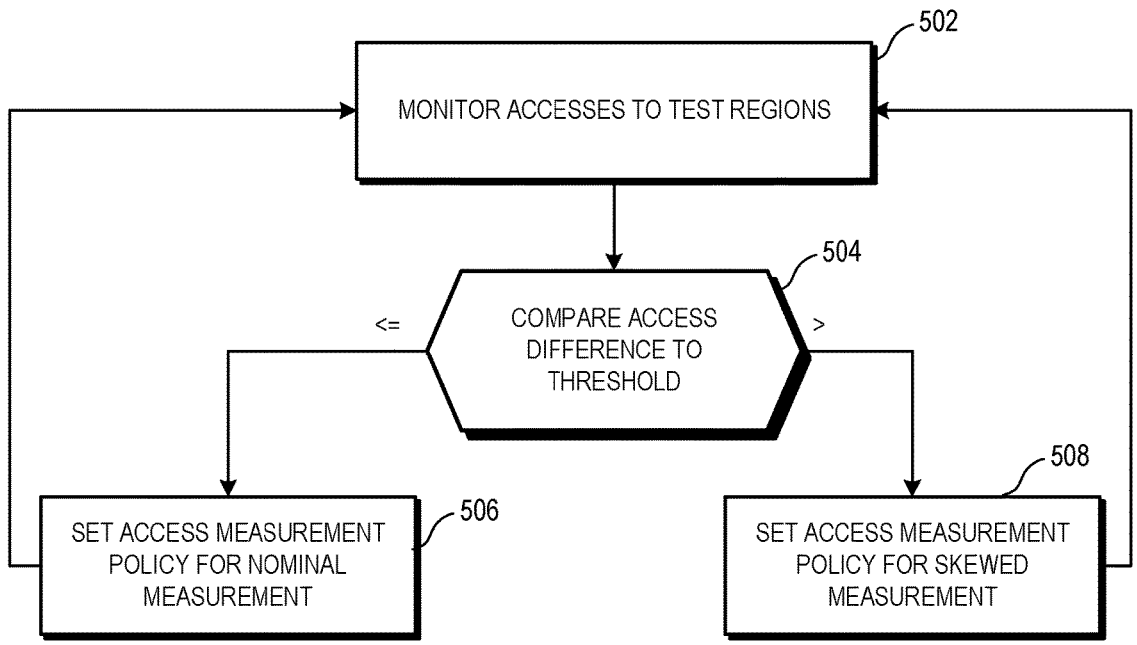
FIG. 5 is a flow diagram of a method of access measurements for different test regions of a cache in accordance with some embodiments.

FIG. 5 illustrates a flow diagram of a method 500 of setting a memory access measurement policy at a processor in accordance with some embodiments. The method 500 is described with respect to an example implementation at the processor 101. At block 502, the access deskew module 108 records over a sliding time window, the number of accesses to each of the test regions 115 and 116. At block 504, the access deskew module 108 determines the magnitude of the difference between the number of accesses to the test region 115 and the number of accesses to the test region 116 and compares the determined magnitude to the threshold 228. In response to the magnitude of the difference being equal to or less than the threshold 228, the method flow moves to block 506 and the access deskew module 108 sets the measurement policy 117 to its unskewed state wherein, for example, changes to the replacement policy for the non-test region 118 are permitted based on equally weighted performance characteristics for the test regions 115 and 116. The method flow returns to block 502.

Returning to block 504, in response to the magnitude of the difference between the number of accesses to the test region 115 and the number of accesses to the test region 116 being greater than the threshold 228, the method flow moves to block 408 and the access deskew module 108 sets the measurement policy 117 to its deskew state. In some embodiments, while the measurement policy 117 is in the deskew state, the cache controller 105 does not change the replacement policy for the non-test region 118 based on performance characteristics for the test regions 115 and 116. In other embodiments, while the measurement policy 117 is in the deskew state, the cache controller 105 applies different weights to performance characteristics for the test regions 115 and 116 and selects the replacement policy for the non-test region 118 based on the weighted performance characteristics.

Figure 6:
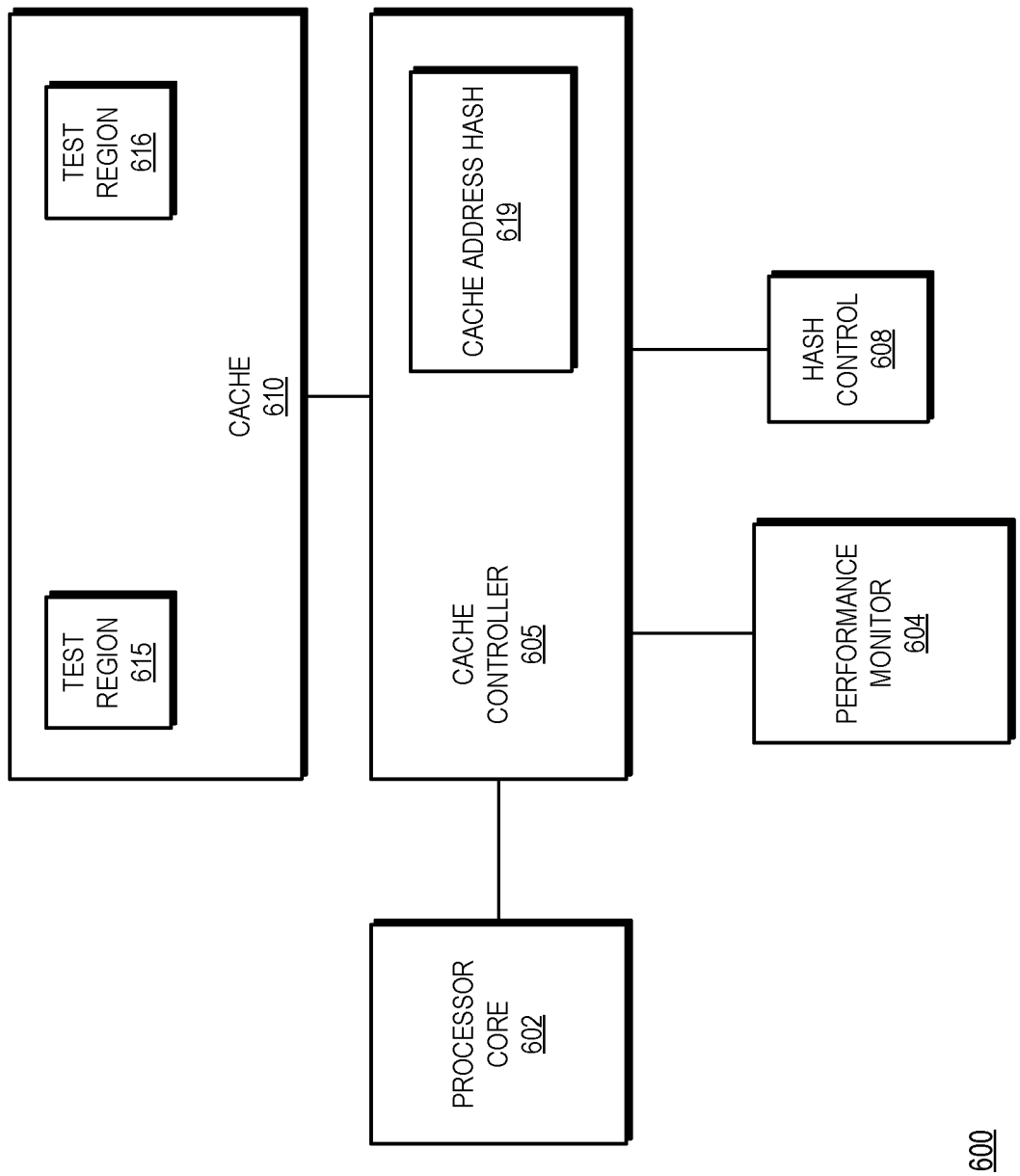
FIG. 6 is a block diagram of a processor that changes an address hash for a cache based on differences in access measurements at test regions of the cache in accordance with some embodiments.

As noted above, in some embodiments the magnitude of the difference in accesses to the test regions 115 and 116 is used for other purposes, instead of or in addition to being used to set an access measurement policy for a processor. An example is illustrated at FIG. 6, which depicts a processor 600 that sets an address hash based on the magnitude of the difference in accesses to cache test regions in accordance with some embodiments. The processor 600 includes processor core 602, a cache controller 605, a performance monitor 604, and a cache 610. Each of these modules operates similarly to the corresponding modules of FIG. 1 described above. In particular, the cache 610 includes two test regions, designated test region 615 and 616 respectively.

In addition, the cache controller 605 accesses the cache 610 using a cache address hash 619. In response to receiving a memory access to the cache 610, the cache controller 605 applies the cache address hash 619 to the memory address of the memory access to generate a hashed address value. The cache controller 605 accesses the cache 610 using the hashed address value. That is, the cache controller 605 accesses the location of the cache 610 indicated by the hashed address value, rather than the original, un-hashed address value provided by the memory access.

In some embodiments, the cache address hash 619 is set to a nominal value that is expected to promote usage of a relatively large percentage of the cache locations of the cache 610. That is, the nominal value of the cache address hash 619 is expected to promote efficient use of the cache 610 by "spreading out" accesses to a relatively large percentage of the cache locations, even if the un-hashed addresses associated with the accesses fall into a relatively narrow range of memory addresses.

However, for some memory access patterns the nominal value of the hash does not sufficiently vary the hashed address values, so that the resulting memory accesses tend to access a relatively small set of cache locations. These memory access patterns are indicated by more frequent accesses to one of the test regions 615 and 616 than to the other test region. Thus, the processor 101 includes a hash control module 608 that compares, over a sliding time window, the difference between the number of memory accesses to the test region 615 and the number of memory accesses to the test region 616, in similar fashion to the access deskew module 108 of FIG. 2. In response to the magnitude of the difference exceeding a threshold, the hash control module 608 changes the cache address hash 619 to a different value. In some embodiments, the hash control module 608 continues to change the cache address hash 619 (e.g., by successively changing the value of different bits of the hash value) until the magnitude of the difference falls below the threshold. The hash control module 608 thereby promotes efficient use of the cache 110 for a variety of different memory access patterns.

In some embodiments, in addition to or instead of changing the value of the cache address hash 619, the cache controller 605 changes the memory addresses associated with one or more of the test regions 615 and 616, thereby shifting the test regions to different regions of the cache 610. Thus, for example, in response to the magnitude of the difference in accesses to the test regions 615 and 616 exceeding the threshold, the cache controller changes the addresses associated with test region 615, thereby shifting the test region 615 to a different portion of the cache 610.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   monitoring accesses to each of a first region of a cache and a second region of the cache;
   selecting a measurement policy based on a first number of monitored accesses to the first region of the cache and a second number of monitored accesses to the second region of the cache; and
   setting a cache replacement policy for a third region of the cache based on the first number of monitored accesses to the first region of the cache and the second number of monitored accesses to the second region of the cache and based on the measurement policy.

2. The method of claim 1, wherein selecting the measurement policy comprises:
   determining a difference between the first number of monitored accesses and the second number of monitored accesses;
   selecting a first measurement policy in response to the difference being less than a threshold; and
   selecting a second measurement policy in response to the difference being greater than or equal to the threshold.

3. The method of claim 2, wherein:
   the first measurement policy comprises allowing changes to the cache replacement policy; and
   the second measurement policy comprises preventing changes to the cache replacement policy.

4. The method of claim 2, wherein:
   the first measurement policy comprises applying a first weight to the monitored accesses to the first region and a second weight to the monitored accesses to the second region;
   the second measurement policy comprises applying a third weight to the monitored accesses to the first region and a fourth weight to the monitored accesses to the second region; and
   wherein setting the cache replacement policy comprises setting the cache replacement policy based on the weighted monitored accesses to the first region and the weighted monitored accesses to the second region.

5. The method of claim 4, wherein:
   the first weight and the second weight are the same; and
   the third weight is different from the fourth weight.

6. The method of claim 1, wherein selecting the measurement policy comprises:
   determining a first difference between the first number of monitored accesses and the second number of monitored accesses;
   selecting a first weight for the first region and a second weight for the second region based on the first difference;
   weighting monitored accesses to the first region based on the first weight and weighting monitored accesses to the second region based on the second weight; and
   wherein setting the cache replacement policy comprises setting the cache replacement policy based on the weighted monitored accesses to the first region and the weighted monitored accesses to the second region.

7. The method of claim 1, wherein:
   monitoring accesses to each of the first region and the second region comprises:
     monitoring accesses of a first type to each of the first region and the second region and monitoring accesses of a second type to each of the first region and the second region; and
   selecting the measurement policy comprises selecting the measurement policy based on:
     a first difference between a number of accesses of the first type to the first region and a number of accesses of the first type to the second region; and
     a second difference between a number of accesses of the second type to the first region and a number of accesses of the second type to the second region.

8. The method of claim 7, wherein the first type comprises demand accesses and the second type comprises prefetch accesses.

9. The method of claim 1, wherein setting the cache replacement policy comprises setting the cache replacement policy based on a cache hit rate at the first region of the cache and a cache hit rate at the second region of the cache.

10. The method of claim 1, wherein setting the cache replacement policy comprises setting the cache replacement policy based on a cache miss rate at the first region of the cache and a cache miss rate at the second region of the cache.

11. A method, comprising:
monitoring accesses to each of a first region of a cache and a second region of the cache;
selecting a hash value based on a first number of monitored accesses to the first region of the cache and a second number of monitored accesses to the second region of the cache; and
generating cache address values for a third region of the cache based on the selected hash value; and
storing data at the third region of the cache based on the cache address values.

12. The method of claim 11, wherein selecting the hash value comprises:
determining a difference between the first number of monitored accesses and the second number of monitored accesses;
selecting a first hash value in response to the difference being less than a threshold; and
selecting a hash value in response to the difference being greater than or equal to the threshold.

13. The method of claim 11, further comprising:
changing addresses associated with the first region of the cache based on the first number of monitored accesses to the first region of the cache and the second number of monitored accesses to the second region of the cache.

14. A processor, comprising:
a cache comprising a first region, a second region, and a third region; and
a cache controller configured to:
monitor accesses to each of the first region and the second region;
select a measurement policy based on a first number of monitored accesses to the first region and a second number of monitored accesses to the second region; and
set a cache replacement policy for the third region based on the first number of monitored accesses to the first region and the second number of monitored accesses to the second region and based on the measurement policy.

15. The processor of claim 14, wherein the cache controller is configured to select the measurement policy by:
determining a difference between the first number of monitored accesses and the second number of monitored accesses;
selecting a first measurement policy in response to the difference being less than a threshold; and
selecting a second measurement policy in response to the difference being greater than or equal to the threshold.

16. The processor of claim 15, wherein:
the first measurement policy comprises allowing changes to the cache replacement policy; and
the second measurement policy comprises preventing changes to the cache replacement policy.

17. The processor of claim 15, wherein:
the first measurement policy comprises applying a first weight to the monitored accesses to the first region and a second weight to the monitored accesses to the second region;
the second measurement policy comprises applying a third weight to the monitored accesses to the first region and a fourth weight to the monitored accesses to the second region; and
wherein setting the cache replacement policy comprises setting the cache replacement policy based on the weighted monitored accesses to the first region and the weighted monitored accesses to the second region.

18. The processor of claim 17, wherein:
the first weight and the second weight are the same; and
the third weight is different from the fourth weight.

19. The processor of claim 14, wherein the cache controller is configured to select the measurement policy by:
determining a first difference between the first number of monitored accesses and the second number of monitored accesses;
selecting a first weight and a second weight for the first region and the second region based on the first difference;
weighting monitored accesses to the first region based on the first weight and weighting monitored accesses to the second region based on the second weight; and
wherein setting the cache replacement policy comprises selecting the cache replacement policy based on the weighted monitored accesses to the first region and the weighted monitored accesses to the second region.

20. The processor of claim 14, wherein the cache replacement policy sets a prefetch policy for the third region of the cache.

* * * * *